UNITED STATES PATENT OFFICE.

KARL BAUER, OF HANOVER, GERMANY, ASSIGNOR TO DRÄGERWERK, HEINR. & BERNH. DRÄGER, OF LÜBECK, GERMANY, A FIRM.

METHOD OF CUTTING OR MACHINING METAL ARTICLES.

1,186,162.  Specification of Letters Patent.  Patented June 6, 1916.

No Drawing.   Application filed March 12, 1914.   Serial No. 824,298.

*To all whom it may concern:*

Be it known that I, KARL BAUER, a subject of the King of Bavaria, and resident of Hanover, in the German Empire, have invented a new and useful Method of Cutting or Machining Metal Articles, of which the following is a specification.

This invention relates to the cutting or machining of metal articles by tools such as cutters, grinders, emery wheels and the like, the chief object being to overcome the harmful influence of the heat generated during the treatment of the metal and to enable the operation to be effected without recourse to the usual finishing operations. The heat generated by the working tool is very often intense and the resulting temperature approaches that of the melting point of the metal under treatment. Consequently, the metal contiguous to the working tool is rendered more or less plastic, so that the tool pushes or crowds the metal aside thus forming burs, the removal of which involves the expenditure of considerable time and labor.

According to this invention the aforesaid objections are overcome by employing a gaseous medium which is adapted to effect the combustion of the glowing metal displaced or crowded aside by the grinding tool. A jet or stream of oxygen may be employed which is adapted to impinge on the displaced metal heated to oxidizing temperature and to burn the same in a similar manner to that taking place in the autogenous method of cutting metal. In this manner the formation of burs on the metal under treatment is effectively prevented and the grinding or machining operation greatly facilitated.

As the torn metal or burs caused by sawing cannot be burned by a stream of oxygen after the metal has become cool, the oxidizing agent is blown into the kerf, made by the tool, or onto the torn and displaced metal while the latter is at oxidizing temperature, thus forming a metal cinder which has such a small resistance that it will fall or may be readily brushed from the cut or ground surface.

I claim:

1. The method of cutting metal, which comprises cutting and thereby heating the metal to oxidizing temperature by means of a rapidly rotating cutting body, and supplying oxygen from a source independent of the surrounding air to the kerf made by such body.

2. The method of cutting metal which comprises frictionally heating the metal to oxidizing temperature by a suitable cutting tool, and simultaneously directing an oxidizing agent from a source independent of the surrounding air onto the particles resulting from the action of such tool.

3. The method of cutting metal, which comprises cutting and frictionally heating the metal to oxidizing temperature, simultaneously directing an oxidizing agent from a source independent of the surrounding air onto the particles resulting from such cutting, and mechanically removing the oxid thus formed.

4. The method of cutting metal, which consists in frictionally heating the metal to a plastic state by means of a rapidly rotating body, advancing the latter into the plastic metal, thereby forming glowing particles and simultaneously blowing a stream of oxygen directed from a source independent of the surrounding air onto the glowing particles to form metal cinders thereof.

KARL BAUER.

Witnesses:
CARL SHADE,
ALBERT LIEBRECHT.

Copies of this patent may be obtained for five cents each, by addressing the "Commissioner of Patents, Washington, D. C."